United States Patent
Woll et al.

(10) Patent No.: US 11,990,777 B2
(45) Date of Patent: May 21, 2024

(54) METHOD FOR OPERATING A BATTERY SYSTEM

(71) Applicant: Robert Bosch GmbH, Stuttgart (DE)

(72) Inventors: Christoph Woll, Gerlingen (DE); Gunther Handte, Unterensingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 394 days.

(21) Appl. No.: 17/393,028

(22) Filed: Aug. 3, 2021

(65) Prior Publication Data

US 2022/0045525 A1    Feb. 10, 2022

(30) Foreign Application Priority Data

Aug. 7, 2020 (DE) ........................ 102020210046.2

(51) Int. Cl.
*H02J 7/00* (2006.01)
*H01M 10/44* (2006.01)

(52) U.S. Cl.
CPC ......... *H02J 7/0024* (2013.01); *H01M 10/441* (2013.01); *H02J 7/0025* (2020.01);
(Continued)

(58) Field of Classification Search
CPC ...... H02J 7/0024; H02J 7/0025; H02J 7/0069; H02J 7/007182; H02J 2207/10;
(Continued)

(56) References Cited

U.S. PATENT DOCUMENTS

| 8,471,529 B2 * | 6/2013 | Vance | ................... | H02J 7/0024 |
| | | | | 324/426 |
| 8,970,144 B2 * | 3/2015 | Fink | ........................ | B60L 58/19 |
| | | | | 318/34 |

(Continued)

FOREIGN PATENT DOCUMENTS

| DE | 102011115628 A1 | 4/2012 |
| DE | 102012210910 A1 | 1/2014 |

(Continued)

OTHER PUBLICATIONS

Z. Song, F. P. Delgado, J. Hou, H. Hofmann and J. Sun, "Individual Cell Fault Detection for Parallel-Connected Battery Cells Based on the Statistical Model and Analysis," 2020 American Control Conference (ACC), Denver, CO, USA, 2020, pp. 1155-1160, doi: 10.23919/ACC45564.2020.9147423. (Year: 2020).*

(Continued)

*Primary Examiner* — M Baye Diao
(74) *Attorney, Agent, or Firm* — NORTON ROSE FULBRIGHT US LLP; Gerard A. Messina

(57) ABSTRACT

A method for operating a battery system. The battery system includes parallel-connected strings. Each string includes at least one battery module. In the battery module, multiple battery cells are interconnected in a series connection and/or in a parallel connection. The strings are switchable on and off from one another. The battery cells and/or battery cell packets are switchable on and off from one another and are bypass-able. The method includes: recognizing a fault of a battery cell; switching off and bypassing the faulty battery cell and/or the faulty battery cell packet which includes the faulty battery cell; switching off the faulty string, which includes the faulty battery cell and/or the faulty battery cell packet; comparing the string voltage of the faulty string to the string voltage of intact strings, in which no fault was (Continued)

recognized; discharging the intact strings if voltage differences between the strings exceed a voltage threshold value.

13 Claims, 7 Drawing Sheets

(52) U.S. Cl.
CPC ...... *H02J 7/0069* (2020.01); *H02J 7/007182* (2020.01); *H01M 2220/20* (2013.01); *H02J 2207/10* (2020.01)

(58) Field of Classification Search
CPC .... H02J 7/0016; H02J 7/0013; H02J 7/00032; H02J 7/0019; H02J 7/0031; H02J 7/0047; H01M 10/441; H01M 2220/20; H01M 10/4207; H01M 10/425; H01M 10/44; H01M 10/482; H01M 2010/4271; B60L 2240/547; B60L 3/0046; B60L 58/21; B60L 58/10; Y02E 60/10; Y02T 10/70; G01R 31/382; G01R 31/396
USPC ......................................................... 320/117
See application file for complete search history.

(56) References Cited

U.S. PATENT DOCUMENTS

| | | | | |
|---|---|---|---|---|
| 9,024,586 B2* | 5/2015 | Vance | ................... | B60L 3/0046 320/122 |
| 10,449,868 B2* | 10/2019 | Hale | ....................... | G05F 1/462 |
| 10,693,300 B2* | 6/2020 | Snyder | .............. | H02J 7/007182 |
| 10,811,869 B2* | 10/2020 | Pevear | ..................... | H02H 7/18 |
| 11,031,793 B2* | 6/2021 | Hinterberger | ......... | H01M 50/50 |
| 2005/0052155 A1* | 3/2005 | Surig | .................... | H02J 7/0048 320/116 |
| 2012/0091964 A1 | 4/2012 | Vance et al. | | |
| 2015/0207355 A1* | 7/2015 | Taylor | ................... | H02J 7/0063 320/136 |
| 2016/0240894 A1 | 8/2016 | Wartenberg et al. | | |
| 2017/0207637 A1 | 7/2017 | Sugeno et al. | | |
| 2017/0264126 A1* | 9/2017 | Chazal | .................. | H02J 7/0045 |
| 2022/0055483 A1* | 2/2022 | Wang | ..................... | B60L 58/10 |

FOREIGN PATENT DOCUMENTS

| | | | |
|---|---|---|---|
| DE | 102018201677 A1 | 8/2019 | |
| DE | 102018216192 A1 | 3/2020 | |
| WO | WO-0137393 A1 * | 5/2001 | ............ H02J 7/0024 |

OTHER PUBLICATIONS

Y. Zhu, W. Zhang, J. Cheng and Y. Li, "A novel design of reconfigurable multicell for large-scale battery packs," 2018 International Conference on Power System Technology (POWERCON), Guangzhou, China, 2018, pp. 1445-1452, doi: 10.1109/POWERCON.2018.8602284. (Year: 2018).*

* cited by examiner

METHOD FOR OPERATING A BATTERY SYSTEM

The present invention relates to a method for operating a battery system. The battery system includes multiple strings connected to one another in parallel, each of which includes at least one battery module. Multiple battery cells are interconnected in series connection and/or in parallel connection in the at least one battery module. The individual strings are switchable on and off independently of one another. Individual battery cells or individual battery cell packets, each of which includes multiple battery cells interconnected in parallel, are switchable on and off independently of one another.

The present invention furthermore relates to a battery system that is configured to carry out the method provided according to the present invention.

The present invention also relates to a vehicle which is configured to carry out the method provided according to the present invention and/or includes the battery system provided according to the present invention.

BACKGROUND INFORMATION

In modern electrically driven vehicles, multiple battery cells are interconnected with one another not only in series but also in parallel. A sufficiently high battery capacity and thus a long vehicle range are thus achieved, but also the required power may thus be provided. A parallel connection of such battery cells usually takes place within a battery module, multiple battery cells being connected to one another in series to achieve the required battery voltage. Each battery module includes a battery cell monitoring unit (cell supervising circuit, CSC), which measures the individual battery cell voltages and the temperature(s) in the battery module and passes them on to a higher-level battery control unit (BCU) for further evaluation.

Particular requirements apply to autonomously operated electric vehicles (EV), in particular with respect to the roadworthiness of the vehicle, since it is not permitted for such vehicles to break down. Depending on the degree of automation, these vehicles have to meet a certain safety level (safe stop level, SSL). For this purpose, they are classified according to different risk levels (automotive safety integrity level, ASIL), which is linked to increased demands on the battery design. Less fault-susceptible systems or even fault-tolerant systems may mean a redundancy, i.e., a doubling, of individual subcomponents up to doubling of the entire battery system.

The disadvantages of a redundancy, for example, the installation space and in particular the costs, predominantly apply for the most expensive component of the drivetrain, the battery. Initial approaches are targeted in the direction of constructing the batteries not only in single strings, i.e., individual battery cells or battery cells interconnected in parallel are all interconnected in series, but rather constructing the batteries from two or even more battery modules which are interconnected in parallel. Multiple battery modules interconnected in parallel only mean more installation space to a limited extent, since the battery cells have to be halved or even quartered in accordance with their battery capacity.

If a battery cell fails due to a fault, the battery module having the faulty battery cell is presently thus switched off or, in the event of faults in multiple modules in one string, the complete string may also be switched off. In battery modules including coupling units at the individual battery cells of the battery module, in case of a fault the faulty battery cell may be bypassed. However, in such a battery system this means that an intact battery cell from all further strings of the battery system also has to be bypassed in each case to obtain the equal voltage in the strings. This also applies to battery systems including modules interconnected in parallel; intact battery cells are thus lost to the battery system.

U.S. Patent Application Publication No. US 2012/0091964 A1 describes a bypass connection for a battery and in particular a serial bypass connection for a vehicle battery system which switches off one or multiple battery cells or modules in the battery system in reaction to a cell or module fault or a potential cell or module fault and bypasses them with the aid of a bypass.

U.S. Patent Application Publication No. US 2016/0240894 A1 describes a battery management system for supervising and regulating the operation of a rechargeable battery, which includes a plurality of battery modules that are electrically interconnected with one another and each include at least one battery cell, the battery management system including at least one controller unit and at least one cell supervising unit, and the at least one cell supervising unit being designed to receive data with respect to at least one operating parameter from at least one battery cell, to record the received data, and to transfer the recorded data to the at least one controller unit.

SUMMARY

In accordance with an example embodiment of the present invention, a method is provided for operating a battery system for a vehicle, in particular an electric vehicle. The battery system includes multiple strings connected to one another in parallel, each of which includes at least one battery module. Multiple battery cells are interconnected in a series connection and/or in a parallel connection in the at least one battery module. The individual strings are switchable on and off independently of one another.

The individual battery cells are preferably switchable on and off independently of one another. The battery system includes first coupling units within the individual battery modules, through the use of which individual battery cells within the battery module may be switched off and may be bypassed via a bypass line, in which second coupling units are accommodated.

The battery cells may advantageously be assembled to form multiple battery cell packets, each of which includes multiple battery cells interconnected in parallel. The battery system includes first coupling units within the individual battery modules, through the use of which individual battery cell packets within the battery module may be switched off and may be bypassed via a bypass line, in which second coupling units are accommodated.

In accordance with an example embodiment of the present invention, the battery system may include a battery control unit for the supervision of the at least one battery module and for the activation of the main switches and/or the first and the second coupling unit. The at least one battery module may include a battery cell supervising unit including sensors for detecting measured values of the battery cells and the at least one battery module. The battery cell supervising unit communicates with the battery control unit. The battery control unit may include an evaluation electronics unit for evaluating the measured values of the battery cells and the at least one battery module detected by the sensors.

The measured values detected by the sensors include, for example, a temperature and a voltage of each individual battery cell and a temperature and a voltage of the entire battery module.

Furthermore, the battery system may be designed in such a way that it includes first coupling units, through the use of which battery modules may be switched off from the string and may be bypassed via bypass lines, which include second coupling units.

According to an example embodiment of the present invention, initially a fault of a battery cell is detected. This may be carried out by evaluating the measured values. The fault of a battery cell is understood as a cell fault or an electronics fault, which occurs at the electronic parts associated with the battery cell, for example, a battery supervising unit or a sensor.

Subsequently, the faulty battery cell or the faulty battery packet in which the faulty battery cell is located is switched off and bypassed. The faulty battery cell or the faulty battery cell packet remains permanently bypassed.

At the same time, the faulty string, which includes the faulty battery cell or the faulty battery packet, is switched off.

Subsequently, the string voltage of the faulty string is compared to the string voltage of the particular intact strings in which no fault was detected.

The intact strings are thereafter discharged if voltage differences between the strings exceed a voltage threshold value. The faulty string only remains switched off until the string voltages of the intact strings have nearly equalized to the level of the faulty string. The intact strings provide the energy for the electric vehicle and accordingly supply higher string currents.

The faulty string is preferably switched on when voltage differences between the strings fall below the voltage threshold value.

All strings are again available on the same voltage level and may thus supply their maximum power until a final discharge voltage is reached. The energy loss, which is ultimately reflected in the range, solely results from the duration of a voltage adjustment phase and a discharge current. This advantageously has the result that the availability and reliability of the traction supply is increased. Desired safe stop levels may thus be achieved.

The voltage threshold value is preferably in a range from 1 V to 2 V. Battery-damaging compensation currents may thus be prevented.

In accordance with an example embodiment of the present invention, the faulty string is preferably switched on when a recuperation process takes place. The intact battery cells of the faulty string are charged by the recuperation current until a voltage equalization of the strings has taken place. The intact battery cells of all strings are then charged.

The travel may thus be continued without restrictions; a repair may take place thereafter. If battery cell or battery module replacement does not take place and the battery of the electric vehicle is charged, all strings may thus preferably be charged during the charging of the battery system. A charging process is ended upon reaching a string voltage reduced by one or multiple cell voltages.

Alternatively, the intact strings may initially be completely charged during the charging of the battery system including the switched-off faulty string. After the complete charging, a discharge process of the intact strings takes place until the string voltages of all strings are at the same level.

The faulty string is preferably only switched off upon recognition of electronics faults when a string current of the faulty string falls below a current threshold value. The current threshold value is preferably in a range from 15 A to 25 A.

In addition, the method provided according to the present invention may be carried out in such a way that a battery module is switched off upon recognition of battery faults and/or battery module faults.

Furthermore, in accordance with an example embodiment of the present invention, a battery system is provided which is configured to carry out the method provided according to the present invention.

In accordance with an example embodiment of the present invention, a vehicle is also provided, which is configured to carry out the method provided according to the present invention and/or which includes the battery system provided according to the present invention.

Using the method provided according to an example embodiment of the present invention, a battery system may be operated in a manner advantageous with respect to costs and installation space with the maximum possible capacity in case of fault at the same time. The implementation of the method provided according to the present invention is based solely on software and thus no additional hardware is necessary, for example, electronics for the battery system.

A redundant battery module is not required for the battery system. The voltage of the intact battery modules or strings is adapted to that of the faulty battery module or string by the method provided according to the present invention. A range reduction is thus minimized and the availability and the reliability of the traction supply to achieve desired safe stop levels are thus also increased. Furthermore, the method provided according to the present invention is only used in the case of a fault, by which the utilization of the battery control unit of the battery system is minimized.

With the aid of the method provided according to an example embodiment of the present invention, multiple faults may also be mapped within a battery module or a string or multiple faults may also be mapped across battery modules or across strings.

Moreover, the method provided according to an example embodiment of the present invention is fault-independent and is thus applicable for cell faults or electronics faults. In addition, the method provided according to the present invention may also be used for battery systems including coupling units not only for individual battery cells, but also for battery modules.

BRIEF DESCRIPTION OF THE DRAWINGS

Specific embodiments of the present invention are explained in greater detail on the basis of the figures and the following description.

DETAILED DESCRIPTION OF EXAMPLE EMBODIMENTS

Figure 1:
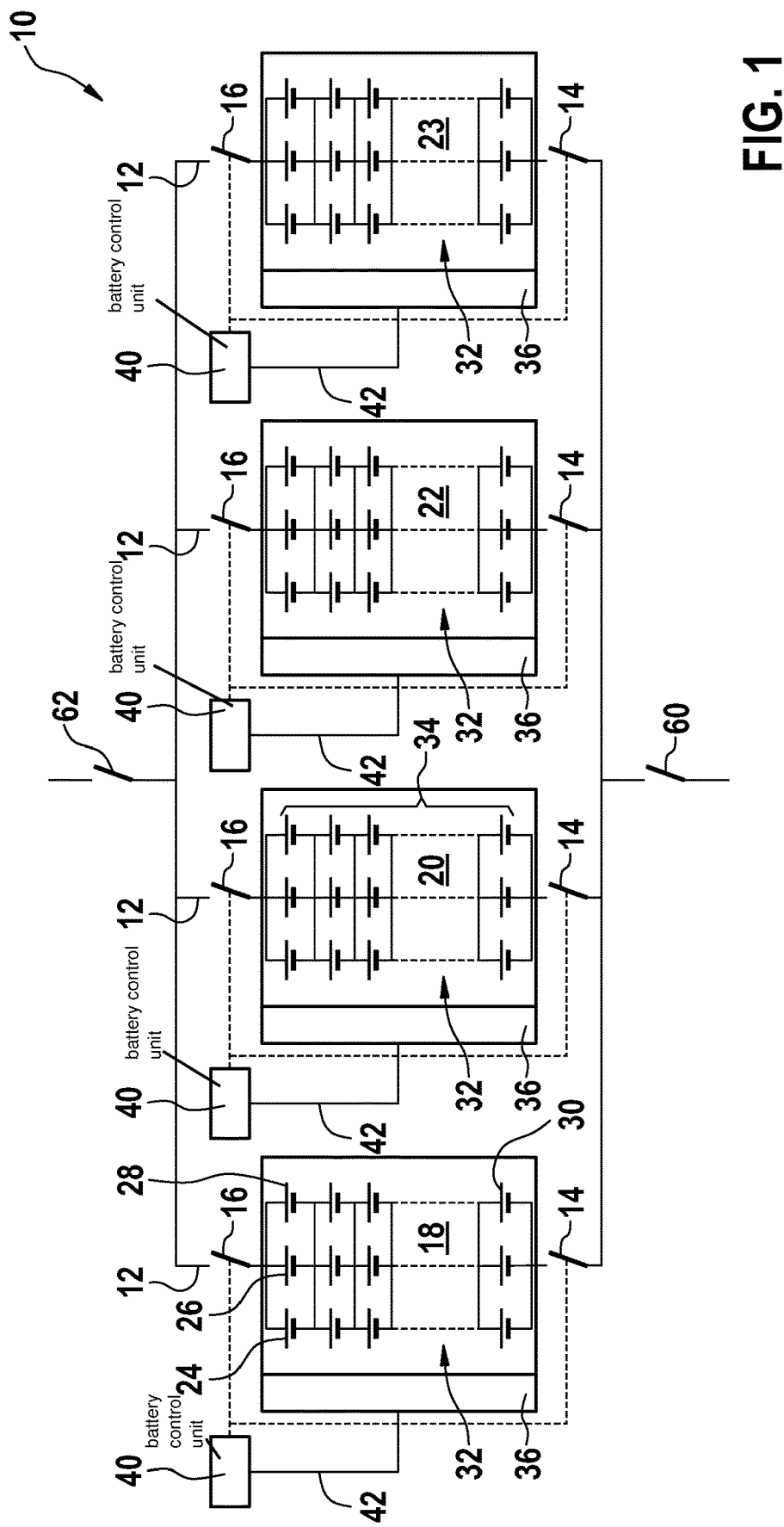
FIG. 1 shows a structure of a four-string battery system including battery cells interconnected in parallel and in series.

FIG. 1 shows a structure of a battery system 10 including four strings 12, each of which includes a battery module 18, 20, 22, 23, a first string contactor 14, and a second string contactor 16. It is shown in the illustration according to FIG. 1 that a battery cell supervising unit 36 is associated with each of battery modules 18, 20, 22, 23. Battery modules 18, 20, 22, 23 are constructed in such a way that battery cells 24, 26, 28, 30 are interconnected with one another in a 12s3p connection 32. Battery system 10 according to the illustration in FIG. 1 includes four battery control units 40, which are each connected to both first string contactor 14 and second string contactor 16 and communicate with battery cell supervising unit 36 of individual battery modules 18, 20, 22, 23 via a communication line 42, for example, a CAN bus. Battery system 10 according to the illustration in FIG. 1 furthermore includes a first main contactor 60 and a second main contactor 62 for switching battery system 10 on and off.

In battery system 10 shown in FIG. 1, ten to twelve battery cells 24, 26, 28, 30 typically form a battery module 18, 20, 22, 23. If multiple such battery modules 18, 20, 22, 23, thus, for example, eight to ten battery modules, are interconnected with one another in series, the required battery voltage of, for example, 400 V is reached.

Figure 2:
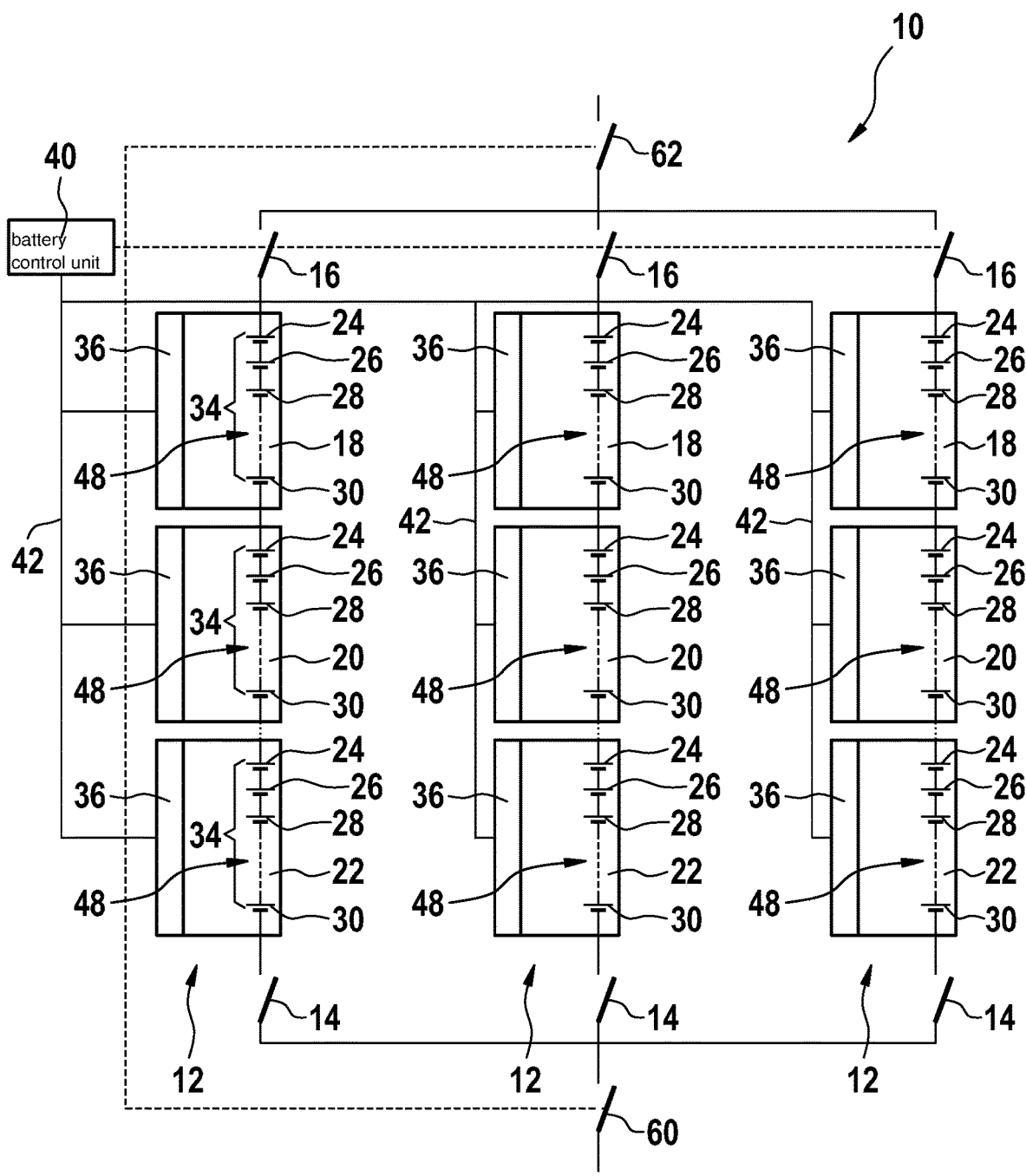
FIG. 2 shows a structure of a three-string battery system in a 1p arrangement.

It is shown the illustration according to FIG. 2 that battery system 10 includes three strings 12. A first battery module 18, a second battery module 20, and a third battery module 22 are located within each of strings 12, which is secured via a first string contactor 14 and a second string contactor 16, battery modules 18, 20, 22 being interconnected with one another in series. As is furthermore apparent from the illustration according to FIG. 2, battery cells 24, 26, 28, 30 are interconnected in the scope of a series connection 34 within individual battery modules 18, 20, 22. The illustration shown in FIG. 2 is also referred to as a 1p arrangement 48. A battery cell supervising unit 36 including sensors (not shown here) is associated with each one of battery modules 18, 20, 22 according to the illustration in FIG. 2. Battery system 10 furthermore includes a battery control unit 40, which communicates via a communication line 42 with battery cell supervising units 36.

Instead of 1p arrangement 48 shown in FIG. 2, individual battery modules 18, 20, 22 may also be constructed in a 2p arrangement or a 3p arrangement 50, cf. the illustration according to FIG. 1. All battery modules 18, 20, 22 according to the illustration in FIG. 2 have an identical structure.

Battery systems 10 shown in FIGS. 1 and 2 are only fault-tolerant insofar as in the case of a fault a battery module 18, 20, 22, 23 or string 12 is switched off, which is accompanied by a capacitance reduction and thus a power reduction.

In the following description of the specific embodiments of the present invention, identical or similar elements are identified by identical reference numerals, a repeated description of these elements being omitted in individual cases. The figures only illustrate the subject matter of the present invention schematically.

Figure 3:
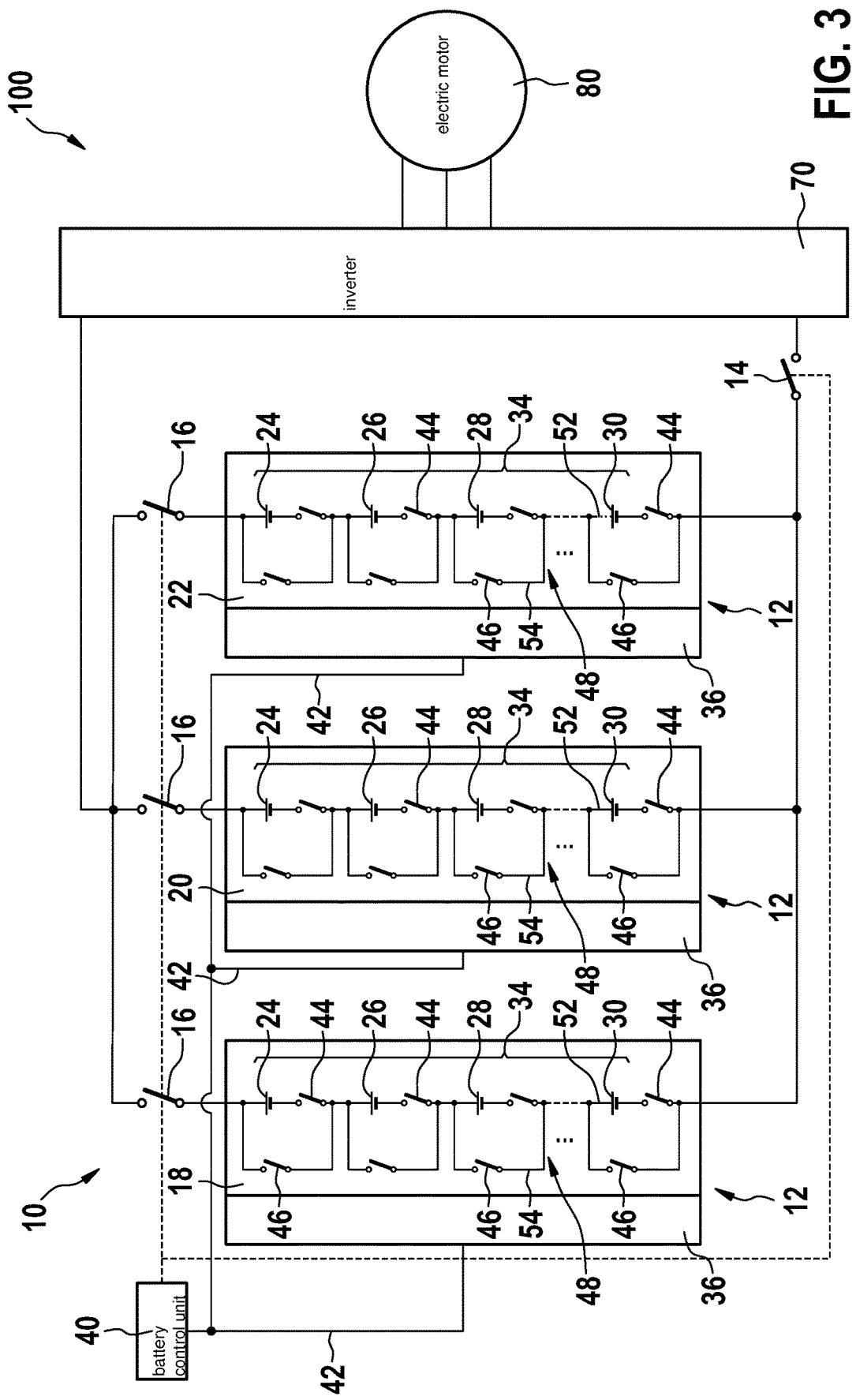
FIG. 3 shows an electrical drive system including a three-string battery system in a 1p arrangement, including battery cell coupling units.

FIG. 3 shows an electrical drive system 100. Electrical drive system 100 includes a three-string battery system 10 and an electric motor 80. Battery system 10 is also an inverter 70, which is connected to electric motor 80.

It is shown in the illustration according to FIG. 3 that strings 12 each include a battery module 18, 20, 22. First string 12 includes first battery module 18, second string 12 includes second battery module 20, and third string 12 includes third battery module 22. The three battery modules 18, 20, 22 of battery system 10 each include a battery cell supervising unit 36. Battery cells 24, 26, 28, 30 are interconnected in series connection 34 in each battery module 18, 20, 22. In contrast to the embodiment of battery modules 18, 20, 22 according to FIG. 2, which are also connected in series connection 34, in battery modules 18, 20, 22 in battery system 10 shown in FIG. 3, first coupling units 44 are provided in a main line 52 of string 12. A bypass line 54, in each of which a second coupling unit 46 is located, is associated with each one of battery cells 24, 26, 28, 30 in battery modules 18, 20, 22 according to the embodiment variant shown in FIG. 3.

If one of battery cells 24, 26, 28, 30 of battery modules 18, 20, 22 according to FIG. 3 fails, particular first coupling unit 44 associated with this battery cell 24, 26, 28, 30 is opened, so that affected battery cell 24, 26, 28, 30 may be switched off. A bypass is carried out by a particular closing of second coupling unit 46 in bypass line 54 associated with particular battery cell 24, 26, 28, 30 to be switched off.

For the sake of completeness, it is to be noted that in battery modules 18, 20, 22 of battery system 10 according to FIG. 3, battery cells 24, 26, 28, 30 are connected in 1p arrangement 48.

A shared first string contactor 14 is associated with strings 12 of battery system 10. To switch off strings 12 independently of one another, strings 12 each include a second string contactor 16.

Instead of bypassing faulty battery cell 24, 26, 28, 30 from battery module 18, 20, 22 and bypassing further intact battery cells 24, 26, 28, 30 from remaining battery modules 18, 20, 22 or strings 12 for the purpose of voltage equalization, which is accompanied by a voltage reduction and ultimately by a range reduction, a voltage equalization is carried out here by actuating second string contactor 16 of battery module 18, 20, 22 of string 12 including faulty battery cell 24, 26, 28, 30.

To illustrate the method provided according to the present invention, it is assumed here that a fault exists in first battery cell 24 of first battery module 18. Of course, faults may exist in another or multiple battery cells 24, 26, 28, 30 of a battery module 18, 20, 22 or various battery modules 18, 20, 22.

If battery control unit 40, in which a battery system management system is implemented, recognizes a fault of first battery cell 24 of first battery module 18, whether it is a cell fault or an electronics fault, first and second coupling unit 44, 46 of first battery cell 24 of first battery module 18 are thus actuated to permanently bypass this cell. At the same time, second string contactor 16 of first string 12 switches over and disconnects first string 12 from the two other strings 12, since there is a voltage difference between battery modules 18, 20, 22 or strings 12, which would result in high compensation currents, by which battery cells 24, 26, 28, 30 are damaged and thus age faster.

Since string contactors 14, 16 are not to be operated under high load, it is to be ensured that at the switching off time, the current is not excessively large, for example is less than 20 A. This may be taken into consideration without problems in the charging strategy during the charging process.

This is different during travel, thus in the discharging process; an abrupt power drop is not to take place here. A fault type recognition of a safety-critical cell fault or a less critical electronics fault has the result that in the latter case a delay of the switching off may be enabled until the current condition is met, for example, at a standstill at a traffic light or in coasting operation, when there is no torque request. However, a safety-critical cell fault has to result in switching off immediately after it is recognized. The driver may be informed by a notification in the cockpit about a possible immediately imminent power drop. The battery management system will counteract the power reduction as much as possible in that it allocates the requested current to the two intact strings 12, second and third string 12 or battery module 20, 22 here, and thus battery cells 24, 26, 28, 30 of second and third string 12 or battery modules 20, 22 are subjected to higher string currents within the limits of what is permitted. The driver therefore only feels a power drop in full load operation, thus at maximal torque request.

Second string contactor 16 of first string 12 only remains open until the voltages of first and second string 12 have nearly equalized, for example, within approximately 1 V to 2 V, to the level of first string 12. During this time, second and third string 12 provide the energy for the electric vehicle and supply, as much as possible, correspondingly higher string currents. If a recuperation process takes place in this phase, second string contactor 16 of first string 12 thus closes and intact battery cells 26, 28, 30 of first battery module 18 are charged until a voltage equalization has taken place, while second string contactors 16 of second and third string 12 are open. Battery cells 24, 26, 28, 30 of all three strings 12 are charged thereafter.

All three strings 12 are again available at equal voltage level and may thus apply their maximal power until a final discharge voltage is reached. The energy loss, which ultimately is reflected in the range of the electric vehicle, solely results from the duration of the voltage adaptation phase and the discharge current. This advantageously has the result that the availability and reliability of the traction supply is increased. Desired safe stop levels may thus be achieved.

The travel may thus be continued without restrictions; a repair may take place thereafter. If battery cell or battery module replacement does not take place and the battery of the electric vehicle is charged, the charging process may thus be ended either upon reaching the string voltage reduced by a cell voltage. Alternatively, the two intact strings 12 may also still be completely charged by opening second string contactor 16 of first string 12. In this case, the discharge process takes place as described above having open second string contactor 16 of first string 12 until the voltages of the three strings 12 are at the same level.

This structure has the advantage that multiple faults in a battery module 18, 20, 22 or a string 12, so-called double fault or multiple faults, may also be handled. Faults in different strings 12 may also be mapped using the method provided according to the present invention. The method provided according to the present invention offers the advantage that no further battery cells 24, 26, 28, 30 have to be switched off except for faulty battery cell 24, 26, 28, 30, which is accompanied by a lesser range reduction. The operation of battery system 10 in the case of a fault is thus ensured without additional hardware at maximal possible capacitance at the same time.

Figure 4:
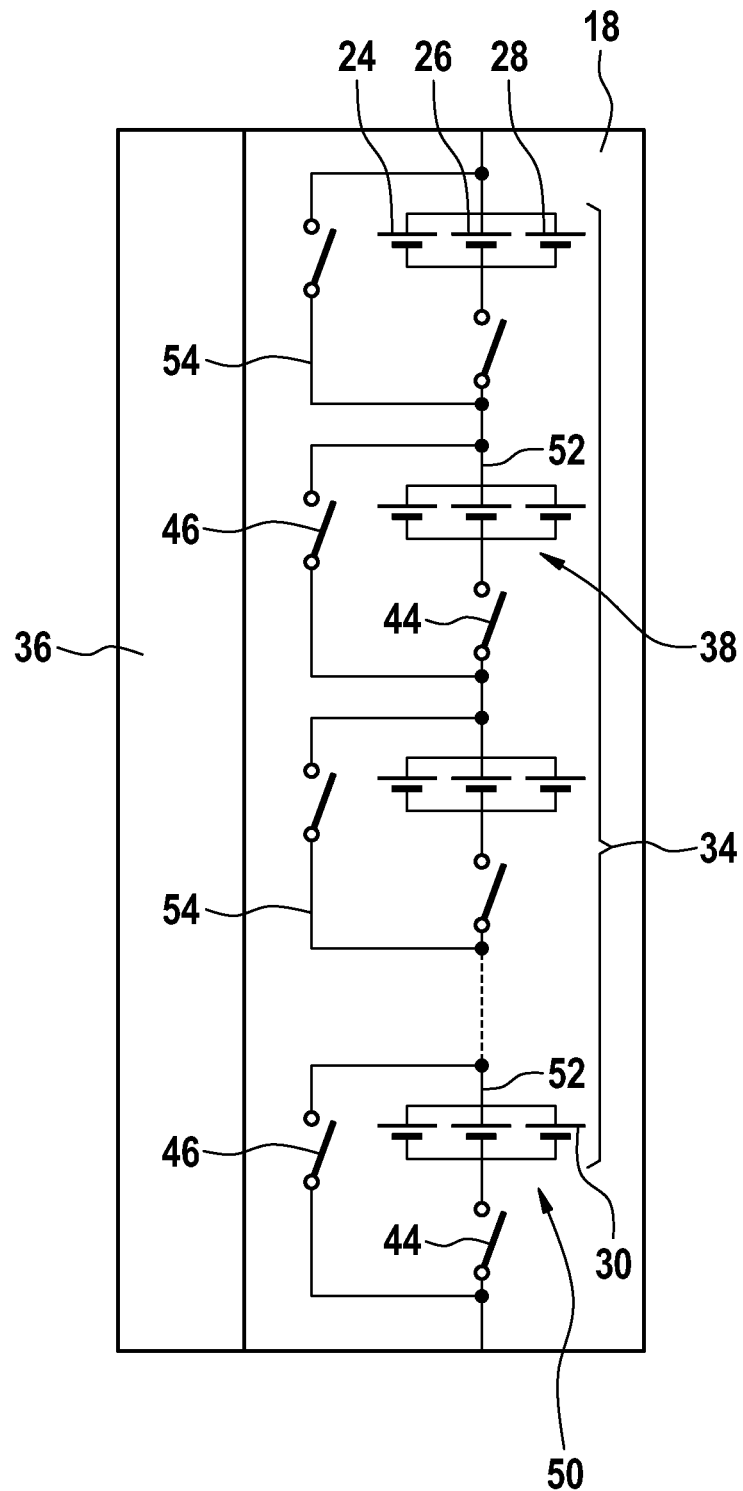
FIG. 4 shows a battery module including battery cells connected in series in a 3p arrangement including battery cell coupling unit.

FIG. 4 shows first battery module 18 of fault-tolerant battery system 10 including first and second coupling units 44, 46, which are associated with battery cells 24, 26, 28, 30 interconnected in 3p arrangement 50.

In FIG. 4, first battery module 18 is constructed in such a way that individual battery cells 24, 26, 28, 30 interconnected to form 3p battery cell packets 38 are connected in series connection 34, for example, twelve battery cell packets 38. First battery module 18 according to FIG. 4 is constructed in such a way that first coupling unit 44 in main line 52 is located before each 3p arrangement 50 or each battery cell packet 38 of individual battery cells 24, 26, 28, 30. Bypass line 54, in which second coupling unit 46 is accommodated, branches off before this first coupling unit.

Due to the embodiment variant of first battery module 18 according to the illustration in FIG. 4, further operation of first battery module 18 is also possible if individual battery cells 24, 26, 28, 30 interconnected in 3p arrangement 50 or battery cell packets 38 should fail, so that further operation of first battery module 18 is possible by opening or closing first and second coupling unit 44, 46, i.e., by bypassing damaged battery cell 24, 26, 28, 30.

Figure 5:
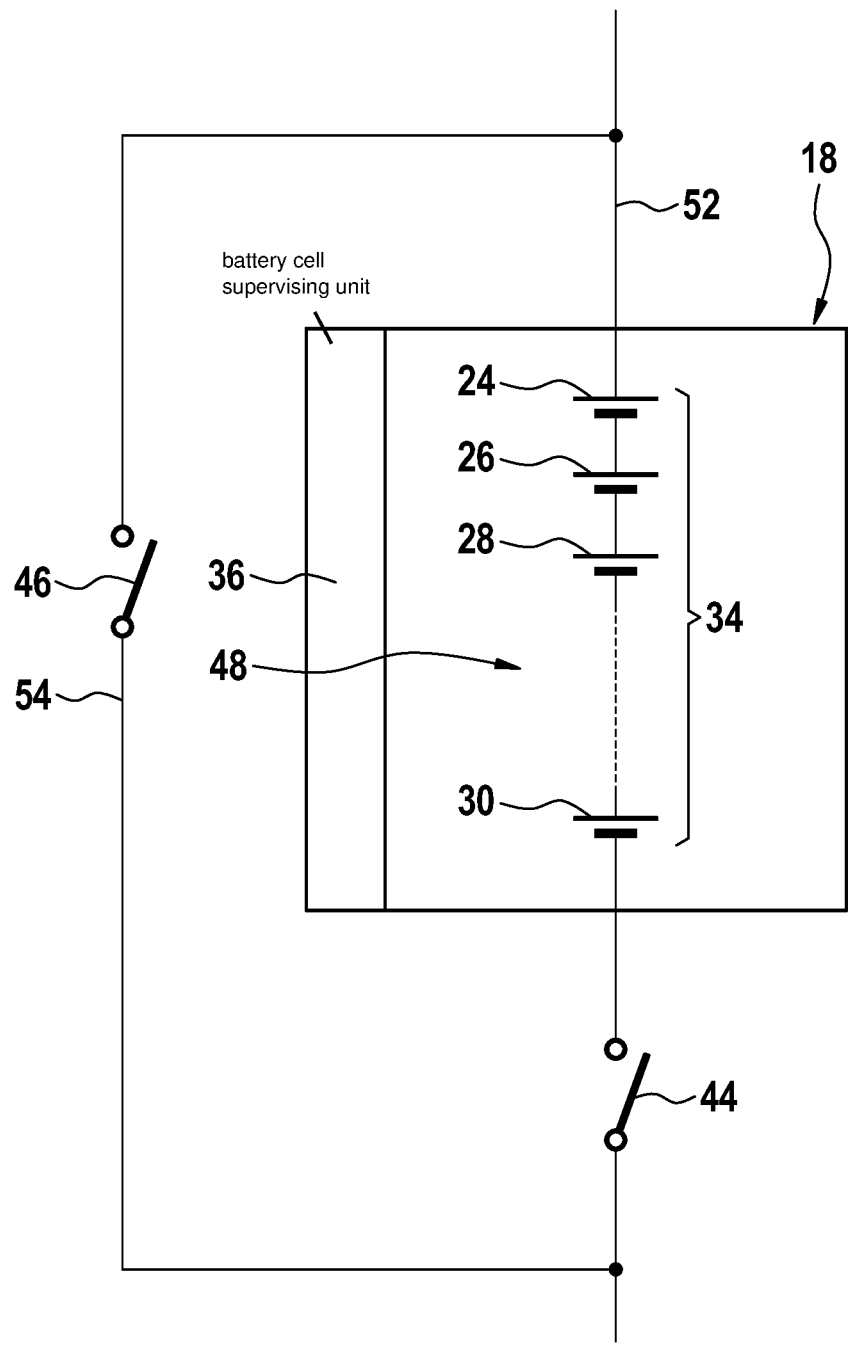
FIG. 5 shows a battery module in a 1p arrangement including coupling units associated with it in a main line and a bypass line.

FIG. 5 shows first battery module 18 in 1p arrangement 48 including coupling units 44, 46 associated therewith in main line and bypass line 52, 54.

A fault-tolerant battery system 10 is apparent in the illustration according to FIG. 5, whose first battery module 18, which is highlighted here by way of example, includes battery cells 24, 26, 28, 30 interconnected with one another in series connection 34. First battery module 18 shows master and slave battery cell supervising units 36, which are each connected to battery cells 24, 26, 28, 30 interconnected with one another in series connection 34.

As may furthermore be apparent from FIG. 5, first coupling unit 44 is located in main line 52, before which, similarly to the embodiment variant according to FIG. 4, bypass line 54 branches off. Second coupling unit 46 is situated in this bypass line. To switch off first battery module 18 from main line 52, first coupling unit 44 is opened and second coupling unit 46 is closed, so that a first battery module 18, which has proven to be faulty, for example, may be bypassed via bypass line 54 within string 12 of battery system 10 and further operation of fault-tolerant battery system 10 provided according to the present invention is possible.

Figure 6:
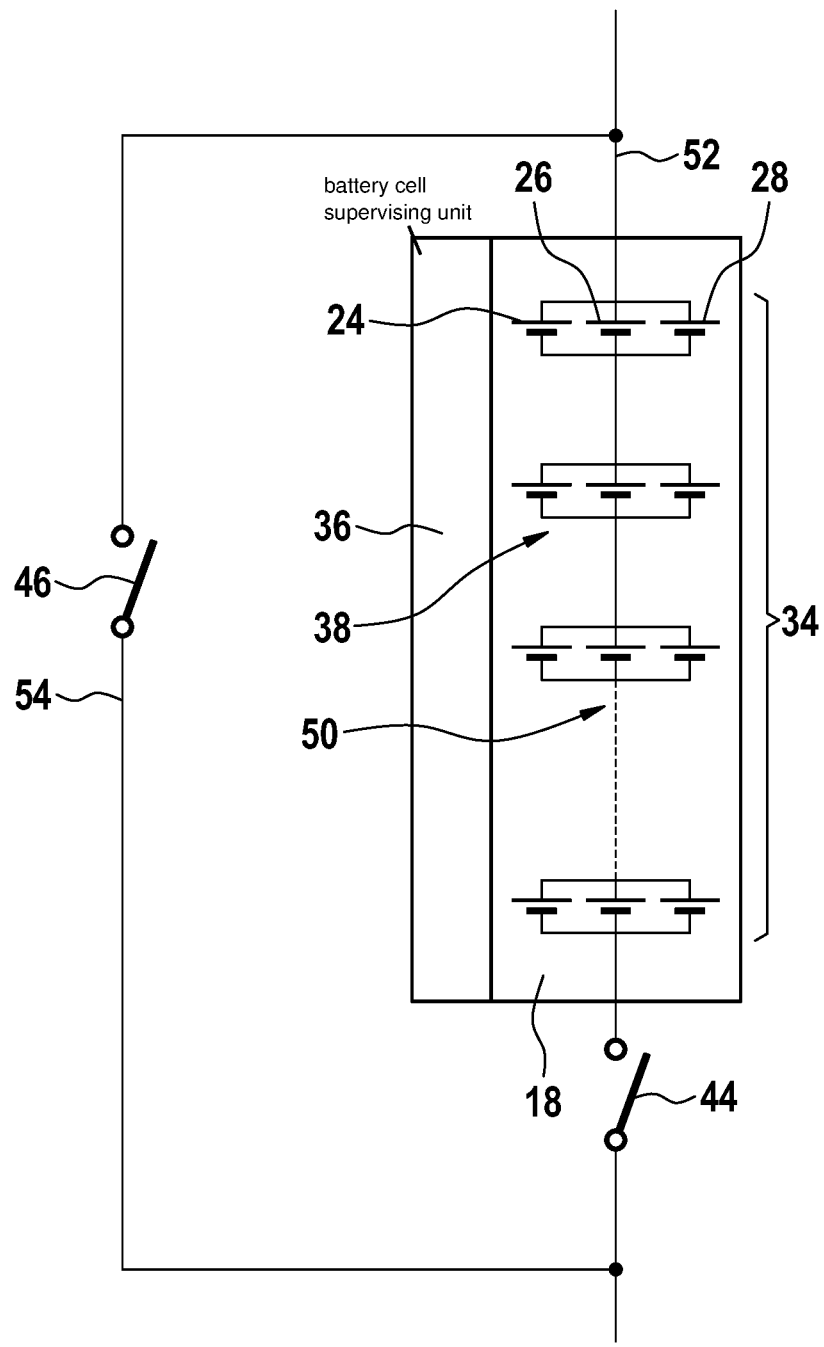
FIG. 6 shows a battery module in 3p arrangement including coupling units associated with it in a main line and a bypass line.

FIG. 6 shows first battery module 18 in 3p arrangement 50, with which a first and a second coupling unit 44, 46 are associated.

It is apparent from FIG. 6 that first battery module 18 shown therein includes a number of battery cells 24, 26, 28, 30, which are each connected in parallel in 3p arrangement 50 or battery cell packets 38. First battery module 18 of battery system 10 highlighted in FIG. 6 includes a first coupling unit 44 in main line 52. Bypass line 54, in which second coupling unit 46 is accommodated, branches off before first coupling unit 44. If battery system 10, whose battery cells 24, 26, 28, 30 interconnected in 3p arrangement 50 are connected in series connection 34, fails, first coupling unit 44 is thus opened, second coupling unit 46 located in bypass line 54 is closed, and therefore the faulty battery module is bypassed, so that only the faulty one of battery modules 18, 20, 22 is switched off in battery system 10 and battery system 10 may be operated further, although with reduced power. It is thus ensured that further operation of the autonomously driving electric vehicle is ensured via battery system 10 according to the present invention, which is designed to be fault-tolerant, the travel does not have to be interrupted, but rather may be continued, although with reduced power and increased duration.

Figure 7:
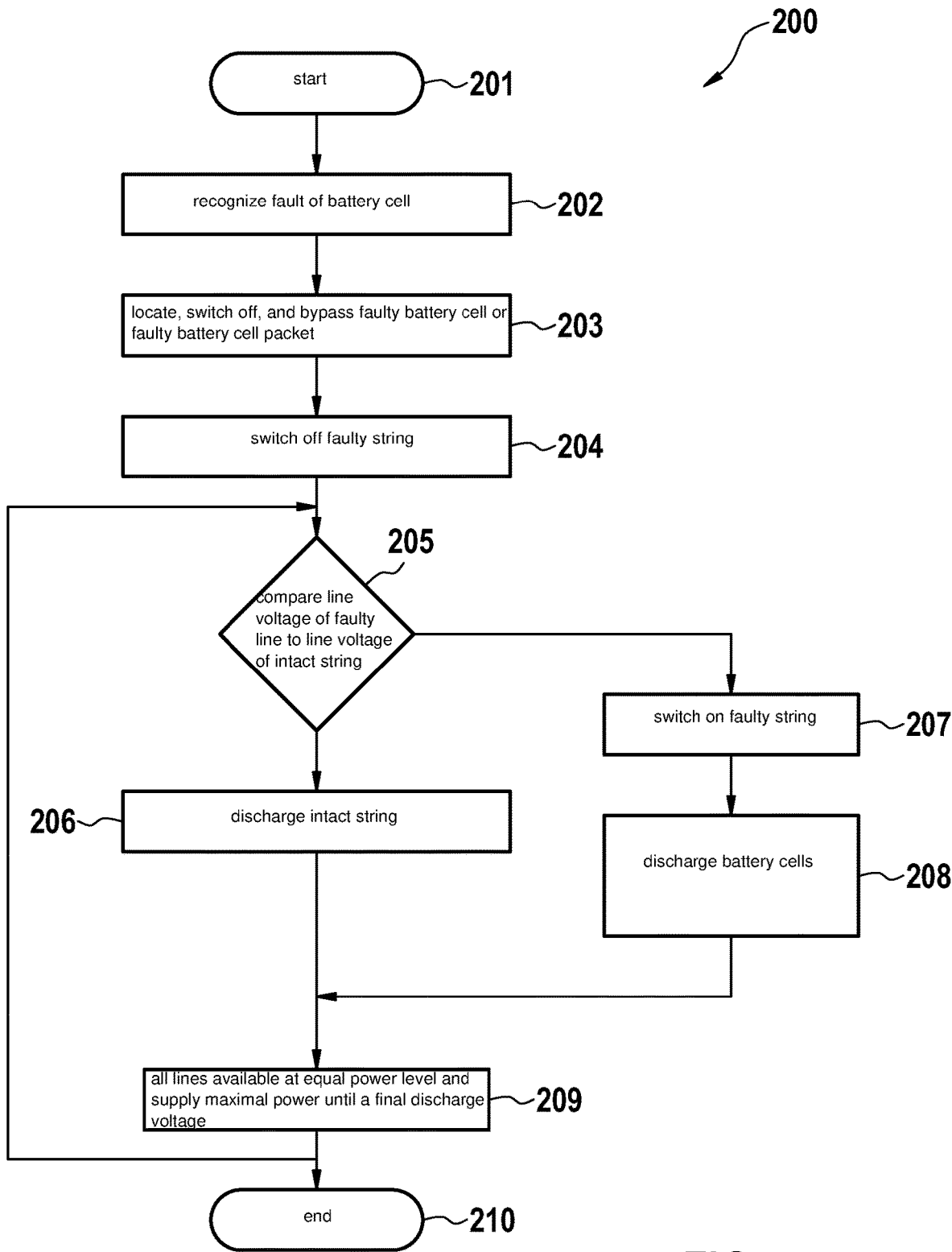
FIG. 7 shows a schematic process flow of the method provided according to an example embodiment of the present invention for operating a fault-tolerant battery system.

FIG. 7 shows a schematic procedure 200 of the method provided according to the present invention for operating a fault-tolerant battery system 10.

It is apparent from FIG. 7 that the method provided according to the present invention begins to run through proceeding from a start in a method step 201.

Initially, a fault of a battery cell 24, 26, 28, 30 is recognized in a method step 202. This may be carried out by evaluating the measured values of battery cells 24, 26, 28, 30.

Subsequently, in a method step 203, faulty battery cell 24, 26, 28, 30 or faulty battery cell packet 38, in which faulty battery cell 24, 26, 28, 30 is located, is switched off and bypassed. Faulty battery cell 24, 26, 28, 30 or faulty battery cell packet 38 remains continuously bypassed.

At the same time, in a method step 204, faulty string 12 is switched off, which includes faulty battery cell 24, 26, 28, 30 or faulty battery cell packet 38.

Subsequently, in a method step 205, the string voltage of faulty string 12 is compared to the string voltage of particular intact strings 12, in which no fault was recognized.

If voltage differences between strings 12 exceed a voltage threshold value, intact strings 12 are discharged in a method step 206. Faulty string 12 only remains switched off until the string voltages of intact strings 12 have nearly equalized to the level of faulty string 12. Intact strings 12 provide the energy for the electric vehicle and accordingly supply higher string currents. If a recuperation process takes place during the discharge of intact strings 12, faulty string 12 is switched on. Intact battery cells 24, 26, 28, 30 of faulty string 12 are charged by the recuperation current until a voltage equalization of strings 12 has taken place. Intact battery cells 24, 26, 28, 30 of all strings 12 are then charged.

If voltage differences between strings 12 fall below the voltage threshold value, faulty string 12 is switched on in a method step 207. Battery cells 24, 26, 28, 30 of all strings 12 are then discharged in a method step 208. If a recuperation process takes place here, battery cells 24, 26, 28, 30 of all strings 12 are also charged.

In a method step 209, all strings 12 are again available at equal voltage level and may thus supply their maximal power until a final discharge voltage is reached and the method provided according to the present invention is ended in a method step 210, when battery system 10 is switched off.

The present invention is not restricted to the exemplary embodiments described here and the aspects emphasized therein. Rather, a variety of modifications, which are routine measures in the art, is possible within the scope of the present invention.

What is claimed is:

1. A method for operating a battery system, which includes multiple strings connected to one another in parallel, wherein (a) each of the strings includes at least one battery module in which multiple battery cells are interconnected in a series connection and/or in a parallel connection, (b) the strings are switchable on and off from one another by respective string switches, each of the string switches controlling a respective one of the strings as a whole by an opening of the respective string switch switching off an entirety of the respective string, and (c) for each of one or more of the strings, individual battery cells of the battery cells of the respective string and/or individual battery cell packets which each includes multiple battery cells of the battery cells of the respective string are switchable on and off from one another by respective cell switches, each of the cell switches controlling a respective one of the individual battery cells or individual battery cell packet by an opening of the respective cell switch switching off the respective battery cell or respective battery cell packet for a bypass of the respective battery cell or battery cell packet, the method comprising the following steps:

recognizing a fault of one of the battery cells of the battery system;

in response to the recognition of the fault, performing a switch-off procedure that includes:

switching off and bypassing the faulty battery cell and/or a faulty battery cell packet in which the faulty battery cell is located using the respective one of the cell switches that controls the faulty battery cell and/or the faulty cell packet; and switching off a faulty one of the strings which includes the faulty battery cell and/or the faulty battery cell packet using the respective one of the string switches that controls the faulty electrical battery; and subsequent to the switch-off procedure:

comparing voltages of (a) the faulty string and (b) each of one or more intact ones of the strings in which no fault was recognized to obtain a voltage difference; and based on a result of the comparison being that the voltage difference exceeds a voltage threshold value, discharging the intact strings while the faulty string remains switched off.

2. The method as recited in claim 1, further comprising: subsequent to the switch-off procedure, switching the faulty string back on in response to the result of the comparison being that the voltage difference has fallen below the voltage threshold value.

3. The method as recited in claim 1, wherein the voltage threshold value is in a range from 1 V to 2 V.

4. The method as recited in claim 1, further comprising: subsequent to the switch-off procedure, switching the faulty string back on in response to a recuperation process taking place during the discharge of the intact strings.

5. The method as recited in claim 1, further comprising: subsequent to the switch-off procedure, performing a charging operation by:

switching back on the faulty string, while the faulty battery cell and/or battery cell packet of the faulty string remains switched off; and subsequent to the switching back on of the faulty electrical string, charging all of the strings of the battery system, wherein the charging ends in response to reaching a string voltage reduced by one or multiple cell voltages.

6. The method as recited in claim 1, further comprising: performing a charging operation that completely charges the intact strings; and after the charging, discharging the intact until respective voltages of all of the strings are at the same level.

7. The method as recited in claim 1, wherein the switching off of the faulty string is performed conditional upon the recognition of the fault occurring with a current of the faulty string falling below a current threshold value.

8. The method as recited in claim 7, wherein the current threshold value is in a range from 15 A to 25 A.

9. The method as recited in claim 1, further comprising: subsequent to the switch-off procedure, switching the faulty string back on in response to the result of the comparison being that the voltage difference has fallen below the voltage threshold value, while the faulty battery cell and/or the faulty battery cell packet remains switched off from the switch-off procedure.

10. The method as recited in claim 1, further comprising:
subsequent to the switch-off procedure, switching the faulty string back on in response to a recuperation process taking place during the discharge of the intact strings, while the faulty battery cell and/or the faulty battery cell packet remains switched off from the switch-off procedure.

11. The method as recited in claim 1, further comprising:
subsequent to the switch-off procedure, in response to occurrence of each of at least one predefined condition, switching back on the faulty one of the strings while keeping the faulty battery cell and/or a faulty battery cell packet switched off.

12. A battery system comprising multiple strings connected to one another in parallel, wherein:
each of the strings includes at least one battery module in which multiple battery cells are interconnected in a series connection and/or in a parallel connection;
the strings are switchable on and off from one another by respective string switches, each of the string switches controlling a respective one of the strings as a whole by an opening of the respective string switch switching off an entirety of the respective string;
for each of one or more of the strings, individual battery cells of the battery cells of the respective string and/or individual battery cell packets which each includes multiple battery cells of the battery cells of the respective string are switchable on and off from one another by respective cell switches, each of the cell switches controlling a respective one of the individual battery cells or individual battery cell packet by an opening of the respective cell switch switching off the respective battery cell or respective battery cell packet for a bypass of the respective battery cell or battery cell packet; and
the battery system configured to:
recognize a fault of one of the battery cells of the battery system;
in response to the recognition of the fault, perform a switch-off procedure that includes:
switching off and bypassing the faulty battery cell and/or a faulty battery cell packet in which the faulty battery cell is located using the respective one of the cell switches that controls the faulty battery cell and/or the faulty cell packet; and
switching off a faulty one of the strings which includes the faulty battery cell and/or the faulty battery cell packet using the respective one of the string switches that controls the faulty electrical battery; and
subsequent to the switch-off procedure:
compare voltages of (a) the faulty string and (b) each of one or more intact ones of the strings in which no fault was recognized to obtain a voltage difference; and
based on a result of the comparison being that the voltage difference exceeds a voltage threshold value, discharge the intact strings while the faulty string remains switched off.

13. A vehicle, comprising:
a battery system that includes multiple strings connected to one another in parallel, wherein:
each of the strings includes at least one battery module in which multiple battery cells are interconnected in a series connection and/or in a parallel connection;
the strings are switchable on and off from one another by respective string switches, each of the string switches controlling a respective one of the strings as a whole by an opening of the respective string switch switching off an entirety of the respective string;
for each of one or more of the strings, individual battery cells of the battery cells of the respective string and/or individual battery cell packets which each includes multiple battery cells of the battery cells of the respective string are switchable on and off from one another by respective cell switches, each of the cell switches controlling a respective one of the individual battery cells or individual battery cell packet by an opening of the respective cell switch switching off the respective battery cell or respective battery cell packet for a bypass of the respective battery cell or battery cell packet; and
the battery system configured to:
recognize a fault of one of the battery cells of the battery system;
in response to the recognition of the fault, perform a switch-off procedure that includes:
switching off and bypassing the faulty battery cell and/or a faulty battery cell packet in which the faulty battery cell is located using the respective one of the cell switches that controls the faulty battery cell and/or the faulty cell packet; and
switching off a faulty one of the strings which includes the faulty battery cell and/or the faulty battery cell packet using the respective one of the string switches that controls the faulty electrical battery; and
subsequent to the switch-off procedure:
compare voltages of (a) the faulty string and (b) each of one or more intact ones of the strings in which no fault was recognized to obtain a voltage difference; and
based on a result of the comparison being that the voltage difference exceeds a voltage threshold value, discharge the intact strings while the faulty string remains switched off.

\* \* \* \* \*